United States Patent
Matsui et al.

(10) Patent No.: US 8,640,341 B2
(45) Date of Patent: Feb. 4, 2014

(54) METHOD OF PRODUCING ROLLING SLIDING MEMBER

(75) Inventors: Towako Matsui, Osaka (JP); Katsuhiko Kizawa, Osaka (JP)

(73) Assignee: JTEKT Corporation, Osaka-shi, Osaka (JP)

(*) Notice: Subject to any disclaimer, the term of this patent is extended or adjusted under 35 U.S.C. 154(b) by 335 days.

(21) Appl. No.: 12/853,911

(22) Filed: Aug. 10, 2010

(65) Prior Publication Data
US 2011/0030219 A1  Feb. 10, 2011

(30) Foreign Application Priority Data

Aug. 10, 2009 (JP) ............... P2009-185594
Dec. 18, 2009 (JP) ............... P2009-287435
Jul. 15, 2010 (JP) ............... P2010-160674

(51) Int. Cl.
  *B21D 53/10* (2006.01)
  *F16C 33/00* (2006.01)

(52) U.S. Cl.
  USPC ........... 29/898; 29/898.066; 29/898.069; 29/898.13; 29/898.14; 148/95; 148/545; 148/663; 384/492; 384/625

(58) Field of Classification Search
  USPC ......... 29/898, 898.063, 898.066, 898.13, 29/898.14, 898.069, 898.052; 148/95, 148/906, 545, 663; 384/492, 569, 625, 912
  See application file for complete search history.

(56) References Cited

U.S. PATENT DOCUMENTS

| | | | | |
|---|---|---|---|---|
| 3,737,204 A * | 6/1973 | Burkhardt | ...... | 384/569 |
| 6,325,867 B1 * | 12/2001 | Okita et al. | ...... | 148/318 |
| 6,682,227 B2 * | 1/2004 | Grell et al. | ...... | 384/569 |
| 6,808,571 B2 * | 10/2004 | Tanaka et al. | ...... | 148/663 |
| RE38,936 E * | 1/2006 | Nakamura et al. | ...... | 310/90 |
| 7,422,643 B2 * | 9/2008 | Takayama et al. | ...... | 148/319 |
| 2004/0202567 A1 * | 10/2004 | Takada et al. | ...... | 420/121 |
| 2006/0130333 A1 * | 6/2006 | Toda et al. | ...... | 29/898.13 |
| 2007/0204940 A1 * | 9/2007 | Harada et al. | ...... | 148/663 |
| 2012/0137523 A1 * | 6/2012 | Maeda et al. | ...... | 29/898.063 |

FOREIGN PATENT DOCUMENTS

JP  2005-171322  6/2005

* cited by examiner

*Primary Examiner* — Alexander P Taousakis
(74) *Attorney, Agent, or Firm* — McGinn IP Law Group, PLLC

(57) ABSTRACT

A method of producing a rolling sliding member, wherein, after a work for a rolling sliding member, which is made of a bearing steel and formed in a predetermined shape, is quenched, a heating start temperature is set to be 10 to 100° C., a heating finish temperature is set to be 220 to 350° C., a time between the heating finish time and the heating start time is set to be a heating time, the quenched work for the rolling sliding member is heated so that a rate of temperature increase indicated by the following formula becomes 7 to 35° C./s rate of temperature increase=(heating finish temperature−heating start temperature)/heating time, the work is tempered by being cooled without being maintained at a heating finish temperature from the heating finish time.

12 Claims, 4 Drawing Sheets

METHOD OF PRODUCING ROLLING SLIDING MEMBER

BACKGROUND OF THE INVENTION

1. Field of the Invention

The present invention relates to a method of producing a rolling sliding member. More specifically, for example, the present invention relates to a method of producing a rolling sliding member that can be preferably used in a slim rolling bearing or the like used in an electronic control coupling or the like for a 4WD vehicle.

2. Related Art

As a quenching method of an steel annulus member that can quench the steel annulus member used as a bearing ring of a rolling bearing at a low cost and a high efficiency, there is proposed a quenching method of a steel annulus member which, after heating a steel annulus member having a specific composition up to a predetermined quenching temperature, quenches and cools the steel annulus member in the air by a quenching cooling wind of a specific velocity (e.g., see JP-A-2005-171322).

However, when a tempering of the steel annulus member quenched by the quenching method is performed, at a tempering temperature of 160 to 280° C., a time of 30 minutes or more is generally needed to restore toughness of a hard and brittle quenching martensite. For example, there is a disadvantage in that, because the steel annulus member should be heated at a tempering time of 90 to 120 minutes for a long time (e.g., see paragraph [0011] of JP-A-2005-171322), energy loss during heating increases and a long time is required for the tempering. As a result, the production efficiency deteriorates.

Accordingly, recently, there has been a persistent demand for the development of a method of producing a rolling sliding member which can effectively produce the rolling sliding member with little energy loss and excellent toughness.

The present invention has been made in view of the above-mentioned related art, and an object thereof is to provide a method of producing a rolling sliding member which can effectively produce the rolling sliding member with little energy loss and excellent toughness.

Generally, when tempering a work for a rolling sliding member that has been made of a high carbon chromium bearing steel such as JIS SUJ2 and formed in a predetermined shape, in order to restore the toughness of the martensite which constitutes the work of the quenched rolling sliding member, it is considered that the work should be soaked for the tempering time of 30 minutes or more.

SUMMARY OF THE INVENTION

Thus, the present inventors have carried out detailed research to develop a method of producing a rolling sliding member that can effectively produce the rolling sliding member with improved toughness, with the result that the following knowledge was obtained.

After a work for a rolling sliding member, which is made of a bearing steel and formed in a predetermined shape, is quenched, a heating start temperature is set to be 10 to 100° C., a heating finish temperature is set to be 220 to 350° C., a time between a heating finish time and a heating start time is set to be a heating time, the quenched work for the rolling sliding member is heated so that a rate of temperature increase indicated by the following formula becomes 7 to 35° C./s rate of temperature increase=(heating finish temperature−heating start temperature)/heating time, and the work is tempered by being cooled without being maintained at a heating finish temperature from the heating finish time (without performing a soaking treatment). In this case, an average particle diameter of the carbides precipitated in tempering can be made small, whereby toughness is improved. The present invention has been completed based on this knowledge.

In addition, in the present invention, it is desirable that the temperature of the work for the rolling sliding member be raised during the heating time, without lowering the temperature of the work for the rolling sliding member from the heating start temperature to the heating finish temperature. As a result, it is possible to more effectively produce the rolling sliding member with an excellent toughness.

Furthermore, in the present invention, it is desirable that the rate of temperature increase be 10 to 35° C./s. As a result, energy loss further decreases, whereby it is possible to effectively produce the rolling sliding member.

Moreover, in the present invention, the work is tempered by being heated at the rate of temperature increase of 14 to 35° C./s and at the heating time of 12 seconds or less. In this case, when the rolling sliding member having the same hardness is obtained, the energy loss decreases, whereby it is possible to effectively produce the rolling sliding member with improved toughness.

Moreover, in the present invention, it is desirable that the rate of temperature increase be 24 to 35° C./s. As a result, it is possible to effectively produce the rolling sliding member with an excellent toughness.

Furthermore, in the present invention, it is possible to adopt a high carbon chromium bearing steel as the bearing steel.

In the present invention, the quenched work for the rolling sliding member is heated by an induction heating. In this case, it is possible to easily control the rate of temperature increase when heating the quenched work for the rolling sliding member.

In addition, the heated work for the rolling sliding member is tempered by water cooling. In this case, it is possible to effectively and economically temper the work for the rolling sliding member.

According to a method of producing the work for the rolling sliding member of the present invention, an excellent effect, which can effectively produce the rolling sliding member with little energy loss and improved toughness, is exhibited.

DETAILED DESCRIPTION OF THE PREFERRED EMBODIMENTS

As described above, the present invention is characterized in that, after the work for a rolling sliding member, which has been made of a bearing steel and formed in a predetermined shape, is quenched, a heating start temperature is set to 10 to 100° C., a heating finish temperature is set to 220 to 350° C., and a time between the heating finish time and the heating start time is set to be a heating time, the quenched work for the rolling sliding member is heated so that a rate of temperature increase indicated by the following formula becomes 7 to 35° C./s, > rate of temperature increase=(heating finish temperature−heating start temperature)/heating time, so that the work is tempered by being cooled without being maintained at the heating finish temperature from the heating finish time(without performing a soaking treatment).

The work for the rolling sliding member formed in a predetermined shape used in the present invention is made of a bearing steel. As the bearing steel, for example, a high carbon chromium bearing steel such as JIS SUJ2, JIS SUJ3, and JIS SUJ5; a case hardened steel such as SAE 5120 and SCr420 are included, but the present invention is not limited only to these example. Among them, the high carbon chromium bearing steel such as JIS SUJ2 is further improved in hardness and a withstand load and can be preferably used from the viewpoint of producing a rolling sliding member having a long life expectancy.

In the present invention, firstly, the work for the rolling sliding member is quenched. The quenching of the work for the rolling sliding member can be performed by being deposited in a medium such as oil having a temperature of about 80 to 120° C. and being rapidly cooled, after the work for the rolling sliding member is heated at the temperature of about 800 to 900° C. for about 0.5 to 3 hours (see FIG. 1). By the rapid cooling, and the air cooling after that, according to circumstances, the temperature of the work for the rolling sliding member after the quenching becomes 10 to 100° C.

Next, the heating start temperature is set to 10 to 100° C., the heating finish temperature is set to 220 to 350° C., and the time between the heating finish time and the heating start time is set to a heating time, the quenched work for the rolling sliding member is heated so that a rate of temperature increase indicated by the following formula becomes 7 to 35° C./s, > rate of temperature increase=(heating finish temperature−heating start temperature)/heating time, so that the work for the rolling sliding member is tempered by being cooled, without being maintained at the heating finish temperature from the heating finish time(without performing a soaking treatment)

Figure 2:
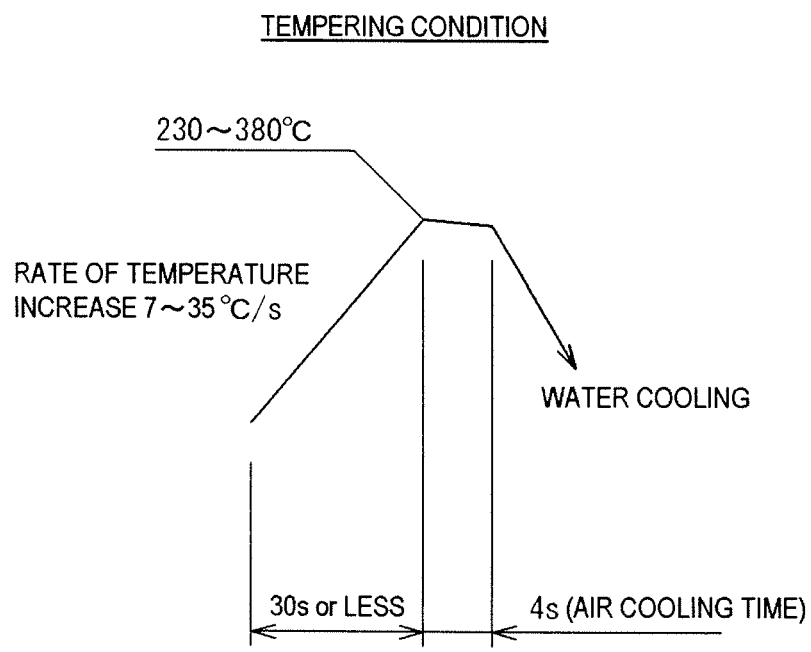
FIG. 2 is a diagram showing a tempering condition in the present invention.

(see FIG. 2). At this time, the temperature of the work for the rolling sliding member is raised during the heating time, without lowering the temperature of the work for the rolling sliding member from the heating start temperature to the heating finish temperature.

In the present invention, a significant characteristic is that an operation of tempering the work for the rolling sliding member by heating the work in this manner after quenching the work for the rolling sliding member is adopted. Because this operation is adopted, it is possible to effectively produce the rolling sliding member with little energy loss and improved toughness.

Generally, since the more fine carbides are densely distributed, the more movement of dislocations is disturbed and a precipitation hardening is operated, it is desirable that the fine carbides do not grow. On the contrary, in the present invention, the quenched work for the rolling sliding member is heated at the rate of temperature increase and is cooled without being maintained at the heating finish temperature from the heating finish time (without performing the soaking treatment). Thus, there is an advantage in that the fine carbides formed by the tempering do not grow, in other words, even if the work is heated at the rate of temperature increase, the toughness of the work for the rolling sliding member does not deteriorate. Furthermore, when the work is heated at the rate of temperature increase and maintained at the heating finish temperature (the soaking treatment is performed), the fine carbides grow, so the toughness deteriorates at the same hardness.

In addition, when the rate of temperature increase is regulated to 10 to 35° C./s, the heating time can be reduced, so the energy loss decreases and the rolling sliding member can be more effectively produced.

In addition, in a case where, after the work for the rolling sliding member formed in a predetermined shape is quenched, the work is tempered by heating the quenched work for the rolling sliding member at the rate of temperature increase of 14 to 35° C./s at the heating time of 12 seconds or less, preferably, 10 seconds or less, it is possible to set the work to further raise the toughness at the same hardness.

From the viewpoint of further improving the toughness of the work for the rolling sliding member and from the viewpoint that the hardness of the bearing is 58 to 62 HRC, it is desirable that the rate of temperature increase be equal to or greater than 14° C./s. From the viewpoint of enabling the rate of temperature increase of the work for the rolling sliding member to be easily controlled, the rate of temperature increase is preferably equal to or less than 35° C./s, and more preferably, 24 to 35° C./s.

The tempering temperature (a final heating temperature) at the time of heating the work for the rolling sliding member when tempering the work for the rolling sliding member in which the quenching is performed is preferably equal to or greater than 220° C., more preferably, equal to or greater than 230° C., from the viewpoint of precipitating the fine carbides having an average particle diameter of 90 nm or less in a lath martensite on the whole rolling sliding member, thereby raising the toughness of the rolling sliding member. The tempering temperature is preferably equal to or less than 380° C., more preferably, equal to or less than 360° C., from the viewpoint of raising the hardness (HRC) of the work for the rolling sliding member in which the quenching is performed.

A heating means at the time of heating the work for the rolling sliding member when tempering the work for the rolling sliding member in which the quenching is performed may be one which can heat the work for the rolling sliding member, in which the quenching is performed, within a predetermined time at a predetermined rate of temperature increase, and although it is not particularly limited, from the viewpoint of easily controlling the rate of temperature increase, for example, an induction heating is preferable.

A time, which is required for heating the work for the rolling sliding member to raise the temperature thereof up to a predetermined temperature when tempering the work for the rolling sliding member in which the quenching is performed, is different depending on the heating start temperature, the rate of temperature increase, and heating finish temperature (quenching temperature), so they cannot be collectively determined. However, from the viewpoint of suppressing the growth of the carbides precipitated in tempering to raise the toughness, and from the viewpoint that the hardness of the bearing is 58 to 62 HRC, the time is preferably equal to or less than 30 seconds, more preferably, equal to or less than 12 seconds, further more preferably, equal to or less than 10 seconds. In addition, in the present invention, it is desirable that the rate of temperature increase and the heating finish temperature (the tempering temperature) when tempering the work for the rolling sliding member in which the quenching is performed is regulated so that the hardness of the work for the rolling sliding member after heating becomes equal to or greater than 58 HRC. At this time, during heating, that is, between from the heating start temperature to the heating finish temperature, it is desirable that the temperature of the work for the rolling sliding member be raised without being lowered.

Next, the work for the rolling sliding member, which is heated to a predetermined heating finish temperature (the tempering temperature), is cooled by the air cooling. However, the air cooling time from the heating to the cooling is preferably equal to or less than 10 seconds, and more preferably, equal to or less than 4 seconds, from the viewpoint of suppressing the growth of the carbides precipitated in tempering. At this time, the heated work for the rolling sliding member is in the almost same temperature on both the surface and the inner part. The air cooling is performed when transiting from the heating to the cooling. In addition, the cooling of the air-cooled work for the rolling sliding member can be performed, for example, by depositing the work for the rolling sliding member in the water (water cooling). The work for the rolling sliding member is cooled to 10 to 40° C. by the water cooling.

After the cooling of the work for the rolling sliding member, by carrying out a polishing machining in the work for the rolling sliding member by a normal method, the rolling sliding member can be produced. The whole rolling sliding member is quenched and is then tempered, whereby the whole part including the surface and the inner part thereof is hardened in almost the same manner.

Since, in the lath martensite in the work for the rolling sliding member, the fine carbide particles having an average particle diameter of 90 nm or less is precipitated, the toughness of the work for the rolling sliding member is raised. The average particle diameter of the fine carbide particles is preferably equal to or less than 50 nm, more preferably, equal to or less than 40 nm, further more preferably, equal to or less than 30 nm, from the viewpoint of raising the toughness. Furthermore, the average particle diameter of the fine carbide particles in the specification means an average value of a maximum particle diameter and a minimum particle diameter of the fine carbide single body.

Hereinafter, the rolling sliding member, which is obtained by a method of producing the rolling sliding member of the present invention, will be described on the basis of the drawings.

Figure 3:
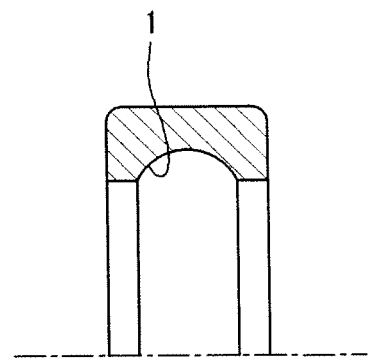
FIG. 3 is a sectional view that shows an embodiment of a rolling sliding member having an outer ring shape of a rolling bearing in the present invention.

FIG. 3 is a sectional view that shows an embodiment of the rolling sliding member having an outer ring shape of the rolling bearing. The rolling sliding member is produced by a high carbon chromium bearing steel, and on a raceway surface 1 that is the rolling sliding surface thereof, a finishing machining is performed by the polishing. In the rolling sliding member, the quenching and the tempering are performed in the overall part including the raceway surface 1.

The rolling sliding member obtained by the production method of the present invention can be preferably used, for example, in an outer ring, an inner ring, a rolling element or the like for a rolling bearing.

EMBODIMENTS

Next, although the present invention will be described in detail on the basis of embodiments, the present invention is not limited to the embodiments. Furthermore, hereinafter, the tempering by an induction heating is called "induction heating tempering", and the tempering by a normal environmental furnace heating is called "furnace tempering".

Embodiments 1 to 5

A work for an outer ring of a rolling bearing (JIS-6202) was produced by the use of JIS SUJ2 as a high carbon chromium bearing steel. The work for the outer ring was heated at 830° C. for 0.5 hours and put into an oil bath of 80° C. to perform an oil quenching, then, the work for the outer ring was heated from the heating start temperature of 20° C. to a tempering temperature (a heating finish temperature) shown in table 1 at a rate of temperature increase and a heating time shown in table 1 by the induction heating tempering, and then, the work for the outer ring was air-cooled for 4 seconds, and then the work was cooled to a room temperature (25° C.) by the water cooling.

The induction heating tempering was performed at a frequency of 1 kHz so that the work for the outer ring was disposed concentrically with an inner diameter side of a fixed coil and a center axis of the work of the outer ring was rotated approximately around the center at a rotation velocity of 100 $min^{-1}$. At this time, a distance in a diameter direction between an outer ring outer periphery surface and the coil was 3 mm. In addition, the temperature of the work for the outer ring in the induction heating tempering was measured by a contact thermometer.

Next, by polishing the outer periphery surface, both end surfaces and the raceway surface of the work for the outer ring, the outer ring of the rolling bearing was produced. The production efficiency of that time was investigated and was evaluated based on the following evaluation standards.

Evaluation Standard of Production Efficiency
  A: heating time (tempering temperature rise time) is equal to or less than 12 seconds
  B: heating time (tempering temperature rise time) is greater than 12 seconds and equal to or less than 30 seconds
  D: heating time (tempering temperature rise time) is greater than 30 seconds As the physical properties of the obtained outer ring of the rolling bearing, a hardness of the surface, a Charpy impact value (toughness) and an average particle diameter of the carbides of the surface were evaluated on the basis of the following method. The results are shown in table 1 and FIG. 4. Furthermore, the hardness of the surface and the average particle diameter of the carbides of the surface were nearly the same values even in regard to the inner part other than the surface of the outer ring.

(1) Hardness of Surface

The surface hardness of the obtained work end surface of the outer ring was measured using a Rockwell hardness tester.

(2) Charpy Impact Value (Toughness)

A Charpy impact test piece in which the quenching and the tempering were performed at the same condition as the obtained outer ring work was produced, and the Charpy impact test was performed using 100 J instrumented Charpy impact tester (manufactured by JT Torsi Inc.). The test was performed after the outer ring work and the Charpy impact test piece had the same qualities (hardness and micro structure (nital, picral corrosion structure, and fine carbide particle diameter)).

In addition, the Charpy impact value is changed by the hardness of the Charpy impact test piece and the impact values of the different hardness can be evaluated by the same standard, so the evaluation standards are set for each hardness as described below.

Evaluation Standard of Charpy Impact Value (Toughness) of 64 HRC
  A: Charpy impact value is equal to or greater than 25 J/cm$^2$
  B: Charpy impact value is equal to or greater than 15 J/cm$^2$ and less than 25 J/cm$^2$
  C: Charpy impact value is less than 15 J/cm$^2$ Evaluation Standard of Charpy Impact Value (Toughness) of 62 HRC
  A: Charpy impact value is equal to or greater than 47 J/cm$^2$
  B: Charpy impact value is equal to or greater than 37 J/cm$^2$ and less than 47 J/cm$^2$
  C: Charpy impact value is less than 37 J/cm$^2$ Evaluation Standard of Charpy Impact Value (Toughness) of 58 HRC
  A: Charpy impact value is equal to or greater than 90 J/cm$^2$
  B: Charpy impact value is equal to or greater than 81 J/cm$^2$ and less than 90 J/cm$^2$
  C: Charpy impact value is less than 81 J/cm$^2$ (3) Average Particle Diameter of Carbides Precipitated in Tempering (Carbides of Surface)

For confirmation of an precipitation state of the fine carbide particles (particles of carbides precipitated in tempering) of the lath martensite in the entire rolling sliding member, the surface of the outer ring of the rolling bearing was observed by a transmission electron microscope (TEM), and an average value of the maximum particle diameter and the minimum particle diameter of the carbide particle single body was obtained.

Furthermore, according to the respective embodiments, by performing the induction heating tempering, the result of satisfactory production efficiency was obtained. In addition, according to the respective embodiments, the heating time (tempering temperature rise time) is preferably equal to or less than 30 seconds.

Comparison Examples 1 to 3

The outer ring of the rolling bearing was produced in the same manner as the embodiment 1 except that, in the embodiment 1, after the oil quenching, by the furnace tempering, the work was heated from the heating start temperature of 20° C. to the tempering temperature (heating finish temperature) shown in table 1 at the rate of temperature increase and the heating time shown in table 1, and then, the work was cooled to the room temperature by the water cooling.

Figure 1:
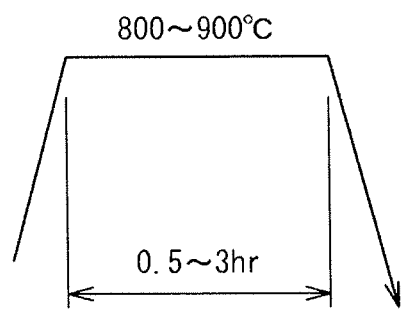
FIG. 1 is a diagram showing a quenching condition in the present invention.
Figure 4:
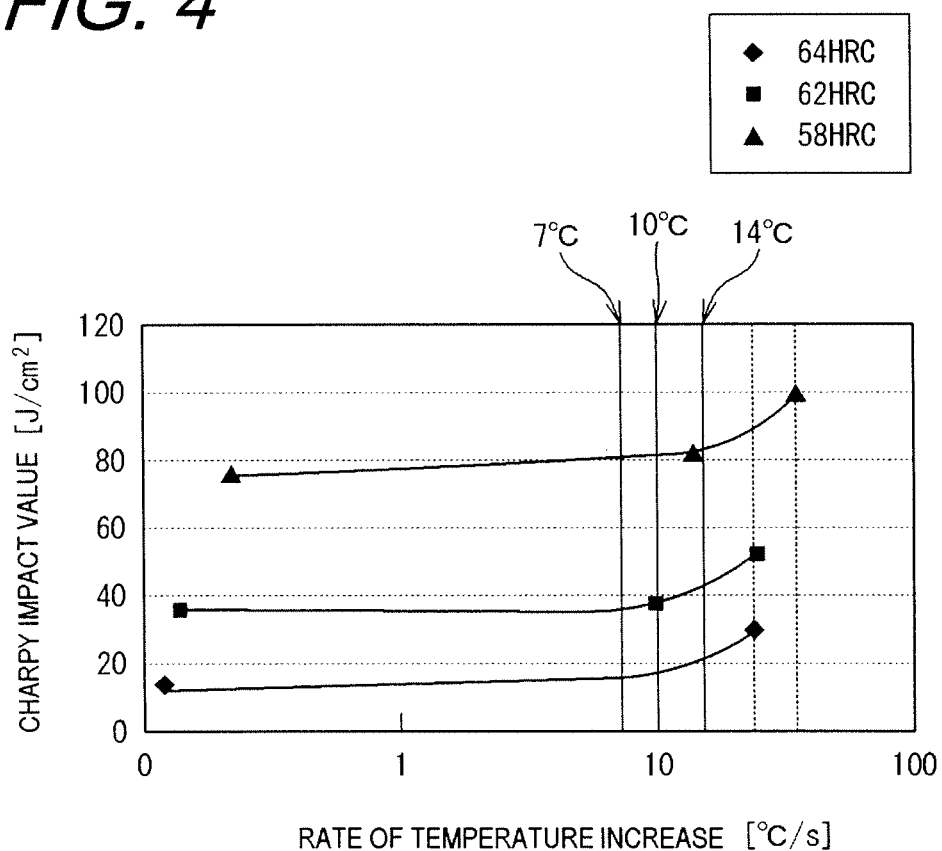
FIG. 4 is a graph that shows a relationship of a rate of temperature increase of the outer ring for rolling bearing and a Charpy impact value that have been obtained in the respective embodiments and the respective comparison examples of the present invention.

As physical properties of the obtained outer ring of the rolling bearing, the hardness of the surface, the Charpy impact value (toughness), and the average particle diameter of the carbides of the surface were evaluated in the same manner as the embodiment 1. Furthermore, in the production efficiency, undesirable results were obtained by performing the furnace tempering. In addition, the heating time (tempering temperature rise time) was undesirable since it was longer than 30 seconds. The results are shown in FIGS. 1 and 4.

Comparison Example 4

The outer ring of the rolling bearing was produced in the same manner as the embodiment 1 except that, in the embodiment 1, after the oil quenching, by the induction heating tempering, the work was heated from the heating start temperature of 20° C. to the tempering temperature (final heating temperature) shown in table 1 at the rate of temperature increase and the heating time shown in table 1, and then the work was cooled for 4 seconds, subsequently, the work was cooled to the room temperature by the water cooling.

As physical properties of the obtained outer ring of the rolling bearing, the hardness of the surface, the Charpy impact value (toughness) and the average particle diameter of the carbides of the surface were evaluated in the same manner as the embodiment 1. Furthermore, as for the production efficiency, the induction heating tempering was performed, but the heating time (tempering temperature rise time) was undesirable since it was longer than 30 seconds. The results are shown in FIGS. 1 and 4.

TABLE 1

| embodiment comparison example number | tempering method | tempering temperature (° C.) | heating time (tempering temperature rise time) (sec) | tempering rate of temperature increase (° C./sec) | production efficiency | the physical properties of outer ring | | | toughness |
|---|---|---|---|---|---|---|---|---|---|
| | | | | | | hardness of surface (HRC) | Charpy impact value (J/cm$^2$) | average particle diameter of carbides precipitated in tempering (carbides of surface) | |
| embodiment 1 | induction heating tempering | 240 | 9.2 | 24 | A | 64 | 30 | 20 | A |
| embodiment 2 | induction heating tempering | 270 | 10 | 25 | A | 62 | 52 | 20 | A |
| embodiment 3 | induction heating tempering | 350 | 9.4 | 35 | A | 58 | 100 | 18 | A |
| embodiment 4 | induction heating tempering | 230 | 21 | 10 | B | 62 | 37 | 70 | B |
| embodiment 5 | induction heating tempering | 300 | 20 | 14 | B | 58 | 82 | 80 | B |
| comparison example 1 | furnace tempering | 150 | 1083 | 0.12 | D | 64 | 14 | 100 | C |
| comparison example 2 | furnace tempering | 180 | 1143 | 0.14 | D | 62 | 36 | 100 | C |
| comparison example 3 | furnace tempering | 260 | 1090 | 0.22 | D | 58 | 76 | 120 | C |
| comparison | induction | 280 | 168 | 1.55 | D | 58 | 80 | 100 | C |

TABLE 1-continued

|  |  |  |  |  |  | the physical properties of outer ring | | | |
| --- | --- | --- | --- | --- | --- | --- | --- | --- | --- |
| embodiment comparison example number | tempering method | tempering temperature (° C.) | heating time (tempering temperature rise time) (sec) | tempering rate of temperature increase (° C./sec) | production efficiency | hardness of surface (HRC) | Charpy impact value (J/cm²) | average particle diameter of carbides precipitated in tempering (carbides of surface) | toughness |
| example 4 | heating tempering | | | | | | | | |

From the results shown in FIG. 1, in the respective embodiments, it is apparent that the toughness was improved and the production efficiency was rapidly improved by performing the induction heating tempering, as compared to the furnace tempering of the comparison examples 1 to 3. In addition, in the embodiments 3 and 5, it is apparent that the Charpy impact value (toughness) is improved, as compared to the induction heating tempering of the comparison example 4. In addition, in the embodiments 2 and 3 in which the heating time (tempering temperature rise time) is equal to or less than 12 seconds, it is apparent that the Charpy impact value (hardness) is further improved than the embodiments 4 and 5 in which the heating time (tempering temperature rise time) is greater than 12 seconds and is equal to or less than 30 seconds.

In addition, the average particle diameter of the carbides included in the outer ring of the furnace tempering product of the comparison examples 1 to 3, which is produced by the furnace tempering as a general production method and is a standard, is greater than 90 nm at 100 to 120 nm, and in the same manner as having an ordinary toughness, the average particle diameter of the fine carbides included in the outer ring of the induction heating tempering product of the comparison example 4 is greater than 90 nm at 100 nm and is not significantly different from the furnace tempering products of the comparison examples 1 to 3, and even in regard to the toughness, it is not significantly different from the furnace tempering products of the comparison examples 1 to 3. On the contrary, it is apparent that the average particle diameter of the carbides included in the outer ring in the respective embodiments is equal to or less than 80 nm which is equal to or less than 90 nm, further, in the embodiments 1 to 3, the average particle diameter is equal to or less than 20 nm (18 to 20 nm), and the toughness is improved as compared to the furnace tempering products of the comparison examples 1 to 3.

In addition, as is apparent from FIG. 4, in each surface hardness (almost identical overall), it is apparent that, when the rate of temperature increase is less than 7° C./s (or less than 10° C./s), the Charpy impact value is not particularly improved by an increase in rate of temperature increase, on the other hand, when the rate of temperature increase is equal to or greater than 7° C./s (or equal to or greater than 10° C./s), the Charpy impact value is improved by an increase in rate of temperature increase, and when the rate of temperature increase is equal to or greater than 14° C./s, the Charpy impact value is rapidly improved by an increase in rate of temperature increase.

From the above-mentioned effects, according to the respective embodiments, the operation is adopted in which, after the work for the rolling sliding member, which has been made of a high carbon chromium bearing steel, is quenched, the heating start temperature is set to be 10 to 100° C., the heating finish temperature is set to be 220 to 350° C., and the time between the heating finish time and the heating start time is set to be a heating time, the quenched work for the rolling sliding member is heated so that a rate of temperature increase indicated by the following formula becomes 7 to 35° C./s, rate of temperature increase=(heating finish temperature−heating start temperature)/heating time, so that the work is tempered by being cooled without being maintained at the heating finish temperature from the heating finish time.

Thus, by the time the rolling sliding member having the same surface hardness is produced, it is possible to effectively produce the rolling sliding member with little energy loss and excellent toughness.

Furthermore, the rate of temperature increase, and the cooling velocity in the air cooling and the water cooling are described by straight lines in FIG. 2, but they, of course, may be changed in a curved manner.

Moreover, in the respective embodiments, the quenching was performed by the oil quenching, but the quenching may be performed by the induction heating quenching.

What is claimed is:

1. A method of producing a rolling sliding member, the method comprising:
providing a rolling sliding member of a predetermined shape and comprising bearing steel;
heating and subsequently quenching the rolling sliding member;
after the quenching the rolling sliding member, heating the rolling sliding member from a heating start temperature to a heating finish temperature over a heating time so that a rate of temperature increase is indicated by the formula:

rate of temperature increase=(heating finish temperature−heating start temperature)/heating time, where the rate of temperature increase is 7° C./s to 35° C./s, the heating start temperature is set to be 10° C. to 100° C., the heating finish temperature is set to be 220° C. to 350° C.; and
cooling the rolling sliding member from the heating finish temperature without being maintained at the heating finish temperature.

2. The method of producing the rolling sliding member according to claim 1,
wherein a temperature of the rolling sliding member is raised during the heating time, without lowering the temperature of the rolling sliding member from the heating start temperature to the heating finish temperature.

3. The method of producing the rolling sliding member according to claim 1,
wherein the rate of temperature increase is 10° C./s to 35° C./s.

4. The method of producing the rolling sliding member according to claim 1,
wherein the rate of temperature increase is 14° C./s to 35° C./s and the heating time is 12 seconds or less.

5. The method of producing the rolling sliding member according to claim 4,
   wherein the rate of temperature increase is 24° C./s to 35° C./s.

6. The method of producing the rolling sliding member according to claim 1,
   wherein the bearing steel comprises a high carbon chromium bearing steel.

7. The method of producing the rolling sliding member according to claim 1,
   wherein the rolling sliding member is heated by an induction heating.

8. The method of producing the rolling sliding member according to claim 1,
   wherein the cooling comprises a water cooling.

9. The method of producing the rolling sliding member according to claim 1, wherein the rolling sliding member comprises an outer ring.

10. The method of producing the rolling sliding member according to claim 1, wherein the rolling sliding member comprises an inner ring.

11. The method of producing the rolling sliding member according to claim 1, wherein the rolling sliding member comprises a rolling element.

12. The method of producing the rolling sliding member according to claim 1, wherein the rolling sliding member comprises a rolling bearing.

* * * * *